UNITED STATES PATENT OFFICE.

WILLIAM PORTER DREAPER, OF LONDON, ENGLAND.

MANUFACTURE OF VISCOSE SOLUTIONS.

1,418,135.

Specification of Letters Patent. Patented May 30, 1922.

No Drawing. Application filed November 14, 1921. Serial No. 515,157.

*To all whom it may concern:*

Be it known that I, WILLIAM PORTER DREAPER, a subject of the King of Great Britain, residing at London, England, have invented new and useful Improvements in the Manufacture of Viscose Solutions, of which the following is a specification.

In the usual production of solutions of cellulose by what is known as the viscose process the cellulose material is first treated with a solution of caustic soda of suitable concentration and then finally treated with the requisite amount of carbon disulphide to form a cellulose xanthate which is finally dissolved in water in such a way that a solution containing the said xanthate is obtained.

In this manufacture certain difficulties are met with in practice which are concerned with the uneven action of the caustic soda on the cellulose material. This leads to corresponding inequalities in the solution finally obtained, which may be particularly objectionable when such a solution is used for the production of artificial silk or transparent films of regenerated cellulose.

I now find that more satisfactory solutions may be obtained by working in the manner hereinafter described, by which means a more certain and equalized action of the caustic soda can be obtained, with the result that the solution of cellulose xanthate obtained is more regular and more free from jellified particles, which when present cause considerable difficulties in procedure and give less perfect products. When prepared properly the regenerated cellulose obtained from such a solution is also of better quality and is nearer in its chemical composition to ordinary cellulose. Consequently artificial silk or films made from the same are stronger and more satisfactory. Also satisfactory solutions may be obtained from forms of cellulose which are difficultly dealt with under ordinary conditions.

To carry out my invention, the cellulose material is introduced into a vessel which is capable of being closed so that it can be made gas tight and will if required sustain a vacuum. In all cases a caustic alkali solution at a low temperature which is below 5° C. and preferably about 0° C. is run on to the cellulose mass in such a way that it completely covers or wets the latter. Certain advantages are secured by this modified treatment and there is less swelling of the fibrous mass and finally a solution of cellulose xanthate is obtained which is of lower viscosity than when the ordinary treatment is followed.

Before this low temperature caustic soda solution is brought into contact with the cellulose material the air in the enclosing vessel may be evacuated. The effect of this treatment with a low temperature caustic alkali solution is seemingly specific and more even in its action, possibly because there is a slower gelatinization of the mass at this lower temperature and therefore a better and more rapid penetration of the solution into the cellulose mass. Both the altered swelling of the cellulose mass and also the reduced viscosity of the final solution of the xanthate indicate a more satisfactory and even action during mercerizing.

In practice the solution of caustic alkali may be brought to a temperature of $-2°$ C. before it comes into contact with the cellulose mass. The effect obtained indicates that there is less breaking down of the cellulose molecule or aggregate when the caustic alkali solution treatment is practised in the manner indicated and a xanthate solution prepared from the same.

In the place of a vacuum the containing vessel may be filled with a gas which is either soluble in the alkali solution or reacts with the same chemically. Thus in the first instance ammonia gas may be used or in the second case sulphur dioxide as these may be considered as examples of the two types of gases mentioned. The cooled caustic soda solution is then allowed to run over or through the cellulose mass, and in this case there is less chance of oxidation of the cellulose mass as this is converted into the mercerized or alkali cellulose product. If the amount of such gas present in the said containing vessel is excessive this may be reduced by partial evacuation of the same before the cooled solution is allowed to come in contact with the cellulose material.

It is known that cellulose has been subjected to the action of a vacuum before it has been mercerized. The special effect obtained in this invention is due to the action of the low temperature caustic soda or alkali solution.

What I claim is :—

1. The preparation of a xanthate solution by first removing air from a cellulose mass, treating the cellulose mass from which air has been removed with a caustic alkali solution at a temperature of below five degrees and afterwards treating it with carbon disulphide.

2. The preparation of a xanthate solution by first displacing air from a cellulose mass by means of another gaseous fluid, then treating the cellulose mass with a caustic alkali solution at a temperature of below five degrees and afterwards treating it with carbon disulphide.

3. The preparation of a xanthate solution by treating a cellulose material with a caustic alkali solution at a temperature of substantially 0° C., and afterwards treating it with carbon disulphide.

4. In the preparation of a cellulose xanthate solution, the step of treating cellulose material with a caustic alkali solution at a temperature not exceeding 5° C.

WILLIAM PORTER DREAPER.

Witnesses:
JAMES C. McRAE,
HENRY J. GREGORY.